United States Patent [19]

Bucsko et al.

[11] Patent Number: 4,564,527

[45] Date of Patent: Jan. 14, 1986

[54] ACIDIFIED VEGETABLES FOR PASTRIES

[75] Inventors: Richard B. Bucsko, Seattle, Wash.; Paul E. Holland, Rancho Polos Verdes, Calif.

[73] Assignee: Carlin Foods Corporation, Chicago, Ill.

[21] Appl. No.: 677,198

[22] Filed: Dec. 3, 1984

Related U.S. Application Data

[63] Continuation of Ser. No. 374,025, May 3, 1982, abandoned.

[51] Int. Cl.$^4$ .................... A21D 10/04; A23L 3/34
[52] U.S. Cl. .................... 426/335; 426/532; 426/552; 426/615; 426/653; 426/519
[58] Field of Search ............ 426/615, 330.5, 335, 426/532, 628, 639, 653, 321, 519, 521, 552; 422/28

[56] References Cited

U.S. PATENT DOCUMENTS

| | | | |
|---|---|---|---|
| 2,687,960 | 8/1954 | Sharp | 426/554 |
| 2,700,613 | 1/1955 | Smith et al. | 426/310 |
| 2,759,827 | 8/1956 | Griffin | 426/650 |
| 3,021,220 | 2/1962 | Going et al. | 426/335 |
| 3,328,178 | 6/1967 | Alderton | 426/334 |
| 3,787,589 | 1/1974 | Stephens et al. | 426/325 |
| 4,022,917 | 5/1977 | Selenke | 426/331 |
| 4,089,985 | 5/1978 | Wolff | 426/615 |

FOREIGN PATENT DOCUMENTS

| | | | |
|---|---|---|---|
| 0126715 | 2/1948 | Australia | 426/639 |
| 0228650 | 6/1959 | Australia | 426/335 |

*Primary Examiner*—Raymond Jones
*Assistant Examiner*—Elizabeth C. Weimar
*Attorney, Agent, or Firm*—Marshall, O'Toole, Gerstein, Murray & Bicknell

[57] ABSTRACT

The present invention relates to batters and methods for preparation of batters comprising an acid-balanced, chemically-leavened baking mix and vegetable preparations. The vegetable preparations comprise a substantially unbuffered vegetable, a sweetener, a preservative, and an edible acid.

8 Claims, No Drawings

ACIDIFIED VEGETABLES FOR PASTRIES

This is a continuation of application Ser. No. 374,025, filed May 3, 1982, now abandoned.

FIELD OF THE INVENTION

The present invention relates to a shelf stable preparation of acidified vegetables for use in an acid-balanced, chemically-leavened batter composition.

BACKGROUND OF THE INVENTION

Cakes and breads having vegetable ingredients, such as carrots, potatoes, zucchini and the like have been popular, but their commercial production and sale has been somewhat underdeveloped, largely because suitably preserved vegetables for use with acid-balanced, chemically-leavened batters have generally not been available. Commercial bakers often purchase pre-mixed batters to which they simply add water, flour, eggs and other ingredients, such as vegetables, before baking to produce the final product. Chemically-leavened batters are often used rather than yeast-leavened batters to attain certain characteristics in the final product, and to minimize processing times.

Chemically-leavened batters usually rely on a reaction between a carbon-dioxide producing agent, such as sodium bicarbonate, and an acid in the batter mix to produce carbon dioxide during baking which raises the mix. The amounts of acid and carbon dioxide producing agent in the pre-mixed dough are carefully balanced to ensure that a sufficient quantity of carbon dioxide is produced, and that all of the acid is used up during the baking process. An unbalanced system can result in undesirable flavor or color in the final product.

Bakers currently have available to them pickled vegetables, fresh vegetables, frozen and canned vegetables for use in preparing a vegetable-containing bread or cake. Pickled vegetables are not satisfactory for use in acid-balanced, chemically-leavened batters because their high acid content distorts the balanced leavening system resulting in undesirable consistancy and texture. Additionally, the resultant "pickled" flavor is highly undesirable. Fresh frozen and canned vegetables have often been used as ingredients in baked products but their use is not completely satisfactory. Preparing fresh vegetables for use in a baked product, for instance, is a time-consuming process for the baker requiring the cutting, cleaning, cooking and seasoning of the vegetables. Seasonal availability and associated spoilage are other problems associated with the storage and use of fresh vegetables that make their use inconvenient. Frozen vegetables present the problems of expensive frozen storage, as well as thawing, cutting and seasoning. Canned vegetables, on the whole, have been retort processed and as a consequence do not have the crisp consistency preferred to produce a commercially desirable product. These disadvantages make it more difficult to produce a product of uniform consistency when fresh, frozen or canned vegetables are used and can involve time-consuming efforts to prepare the vegetables before baking.

OBJECTS OF THE INVENTION

To overcome these disadvantages, it is an object of the present invention to provide a preparation of vegetables for use in an acid-balanced, chemically-leavened batter composition.

An additional object of this invention is to provide a preparation of vegetables for use in an acid-balanced, chemically leavened batter composition which is shelf stable at ambient temperatures for extended periods of time.

SUMMARY OF THE INVENTION

This invention provides a shelf stable preparation of acidified vegetables for use in an acid-balanced, chemically-leavened baking mix comprising, a suitable vegetable, a sweetener, a preservative and an edible acid. The acid is present in an amount sufficient to render the preparation shelf-stable at ambient temperatures yet provide the preparation to be compatible with an acid-balanced, chemically-leavened baking mix.

DETAILED DESCRIPTION OF THE INVENTION

In preserving vegetables and other foods against bacterial growth with acid, the pH, rather than the total amount of acid used, is the important factor. It has been found that certain vegetables are substantially unbuffered, and consequently, their pH may be lowered to a bacteriostatic level with a relatively small amount of acid. Such acidified vegetables can conveniently be employed in a cake or bread mix, without upsetting the chemical leavening system. These preparations obviate the inconvenience of fresh vegetables and the expense and undesirable properties of frozen or canned vegetables.

To produce a preparation in accordance with this invention, a variety of vegetables may be used. Generally, any vegetable that is not naturally pH buffered to a significant extent may be employed. The absence of a natural buffering system in vegetables, such as carrots, zucchini, water chestnuts, bamboo, pumpkins and the like, permits their acidity and the acidity of the finished preparation to be significantly altered by the addition of very small quantities of acid. The amount of acid added to produce a sweetened, shelf-stable preparation of such vegetables is small enough to permit the use of the preparation in a chemically-balanced, acid-leavened batter mix.

The present invention may be illustrated with reference to a preparation of carrots for use with an acid-balanced batter mix to produce carrot cake or carrot bread. Whole carrots are ground by conventional means to a sufficiently small size to provide the finished baked product with a desirable appearance and are then placed in a large cooking vessel. The whole carrots may be fresh or frozen.

After the ground carrots have been placed in the vessel, a sweetening agent is added. The amount of sweetening agent added will depend on the charcteristics of the agent used and the sweetness desired for the final product. Various sweeteners can be used, including sucrose, fructose, regular or high fructose corn syrups, used singularly, in combination and/or combined with artificial sweeteners such as saccharin or aspartame. In general, however, sucrose is the preferred agent as its use in the formulation results in the desirable end product in terms of color and structure. In addition, minimizing the water content of the preparation can enhance its shelf life.

A preservative, such as potassium sorbate, is also added to the preparation in the cooking vessel in a preserving amount. Potassium sorbate, in the presence of an acid, tends to form sorbic acid, which acts as a mold inhibitor or fungistatic agent.

To this mixture is added a small amount of acid sufficient to render the preparation shelf-stable without interfering with the acid balance of the batter mix. Any suitable food grade acidulent may be used, such as acetic, citric, fumaric, malic, succinic, phosphoric or hydrochloric acid; as well as glucono delta lactone, vinegar, lemon, lime or other fruit juices, or fruit juice concentrates. To ensure a shelf stable preparation, the pH of the preparation is adjusted low enough to inhibit bacterial growth, that is, the pH is substantially bacteriostatic. For commercial purposes, the pH is preferably not above about 4.6. The total acid used to achieve a minimum 4.6 pH is so low that it does not disrupt the acid balance of chemically-leavened batter mixes, since such disruption results in a commercially unsatisfactory product. While a lower value of the pH will vary for different dough mixes, it is generally preferred to keep the pH of the preparation at or above about 4.0. A preferred pH range for products of the present invention is from about 4.2 to about 4.6.

When all of the ingredients of the preparation have been placed in the vessel, they are cooked at an appropriate temperature for a period of time sufficient to pasteurize the preparation. The ingredients must also be agitated during cooking to produce a homogeneous mass for addition to a dough mix. The invention and method of making the invention is further illustrated by the following example.

EXAMPLE

One thousand pounds of frozen carrots were ground to an average particle size of ⅜" and were placed in a large steam kettle. One thousand pounds of white sugar were added to the carrots in the steam kettle. Four pounds of potassium sorbate were added to the mixture in the vessel to serve as a mold inhibitor. Two and one-fourth gallons of citric acid were placed in the mixture of carrots, sugar and preservative. The citric acid was prepared by diluting 3.6364 pounds of anhydrous citric acid in one gallon of water.

As the ingredients described above were added to the vessel, an agitator means was kept in motion and heat was added to the mixture until a temperature of 170° F. was reached. The temperature of the mixture was maintained at 170° F. for approximately 5 minutes.

After cooking and formation of a homogeneous preparation, the agitation was halted. The preparation was then removed from the vessel and placed in 30 gallon plastic drums with a plastic liner, which was tied off and the drum closed. The preparation in such sealed containers may be transported and stored at ambient temperatures without refrigeration for approximately 26 weeks after production.

A baker may add a preparation prepared in the manner described in the Example, to a pre-mixed batter composition which is chemically leavened and acid-balanced. Since only a small quantity of acid is required to alter the pH of the preparation, there is not enough acid present in the preparation to disturb the acid balance of the baking mix. Use of this preparation enables the baker to provide a finished product of uniform quality containing suitably spiced and sweetened vegetables by simply combining the desired amount of prepared vegetables with a batter mix and baking the combined ingredients.

We claim:

1. A method for preparation of batter comprising the steps of:
   (a) placing substantially unbuffered vegetables, a sweetener, a preservative amount of preservative and an edible acid in a vessel;
   (b) heating said vegetables, sweetener, preservative and edible acid in said vessel to a temperature of about 170 degrees F. and maintaining said temperature of about 170 degrees F. for approximately 5 minutes;
   (c) agitating said vegetables, sweetener, preservative and edible acid in said vessel until a substantially homogenous pourable preparation of acidified vegetables is formed; and
   (d) adding said preparation of acidified vegetables to an acid-balanced, chemically-leavened baking mix.

2. The method of claim 1, wherein said edible acid is added in an amount sufficient to provide said preparation with a pH in the range of about 4.0 to 4.6.

3. The method of claims 1 or 2, wherein said substantially unbuffered vegetables are carrots.

4. The method of claim 3, wherein said edible acid is citric acid.

5. A batter prepared from a combination of an acid-balanced, chemically-leavened baking mix and a vegetable preparation; the improvement wherein the vegetable preparation comprises:
   (a) a substantially unbuffered vegetable;
   (b) a sweetener;
   (c) a preserving amount of preservative; and
   (d) an edible acid present in an amount sufficient to provide said preparation with a substantially bacteriostatic pH that is compatible with said acid-balanced, chemically-leavened baking mix, and in an amount that is sufficient to render said preparation stable at ambient temperature.

6. The batter of claim 5, wherein said substantially unbuffered vegetable is carrots chopped to a size suitable for addition to a baking mix.

7. The batter of claim 5, wherein said pH is between about 4.0 and about 4.6.

8. The batter of claim 5 wherein said preservative is potassium sorbate and said acid is citric acid.

* * * * *